United States Patent [19]

Price et al.

[11] Patent Number: 4,875,167
[45] Date of Patent: Oct. 17, 1989

[54] ODOMETER DATA COMPUTING APPARATUS

[75] Inventors: John W. Price, Garland; John F. Brady, III, Dallas, both of Tex.

[73] Assignee: Mileage Validator, Inc., Richardson, Tex.

[21] Appl. No.: 214,919

[22] Filed: Jun. 28, 1988

Related U.S. Application Data

[63] Continuation of Ser. No. 861,436, May 9, 1986, abandoned.

[51] Int. Cl.⁴ ............................................. G06F 15/74
[52] U.S. Cl. ............................. 364/424.04; 346/33 R
[58] Field of Search .................... 364/424.04, 550; 340/52 R, 52 F, 438, 459; 346/33 R

[56] References Cited

U.S. PATENT DOCUMENTS

| | | | |
|---|---|---|---|
| 3,836,690 | 9/1974 | Purtle, Jr. | 364/442 |
| 4,067,061 | 1/1978 | Juhasz | 364/900 |
| 4,072,850 | 2/1978 | McGlynn | 364/424 |
| 4,188,618 | 2/1980 | Weisbart | 340/52 F |
| 4,236,215 | 11/1980 | Callahan et al. | 364/436 |
| 4,371,934 | 2/1983 | Wahl et al. | 364/424 |

Primary Examiner—Gary Chin
Attorney, Agent, or Firm—Hubbard, Thurman, Turner & Tucker

[57] ABSTRACT

An odometer data computing apparatus includes an odometer data computer device and a printer. The computer device includes a keypad, liquid crystal display, microcomputer electronics and continuous memory to record beginning and end of trip time, dates, and odometer readings, to separate pleasure trip mileage from business mileage, to compute the business mileage for each trip up to sixty business trips at a given time, to accumulate the total business trip mileage for the year, to end the yearly record promptly at the end of the year by indicating a need to print out the trip information for the year, to store the total mileage for the previous year, and to continue the trip recording for the next year. Trip information, including total mileage information for the previous year, may be printed out at any time during the current year. Also, trip information for each trip currently in memory may be printed out at any time.

2 Claims, 13 Drawing Sheets

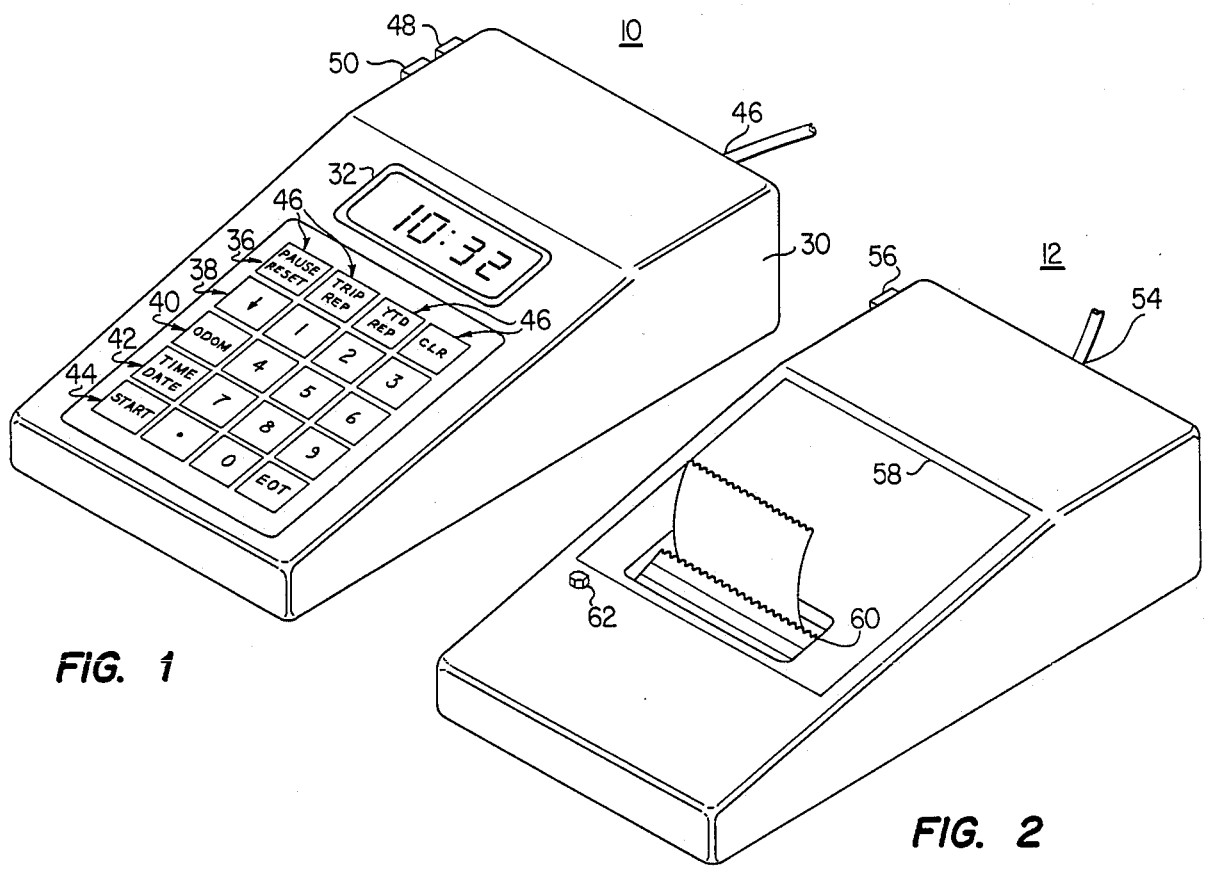
FIG. 1
FIG. 2
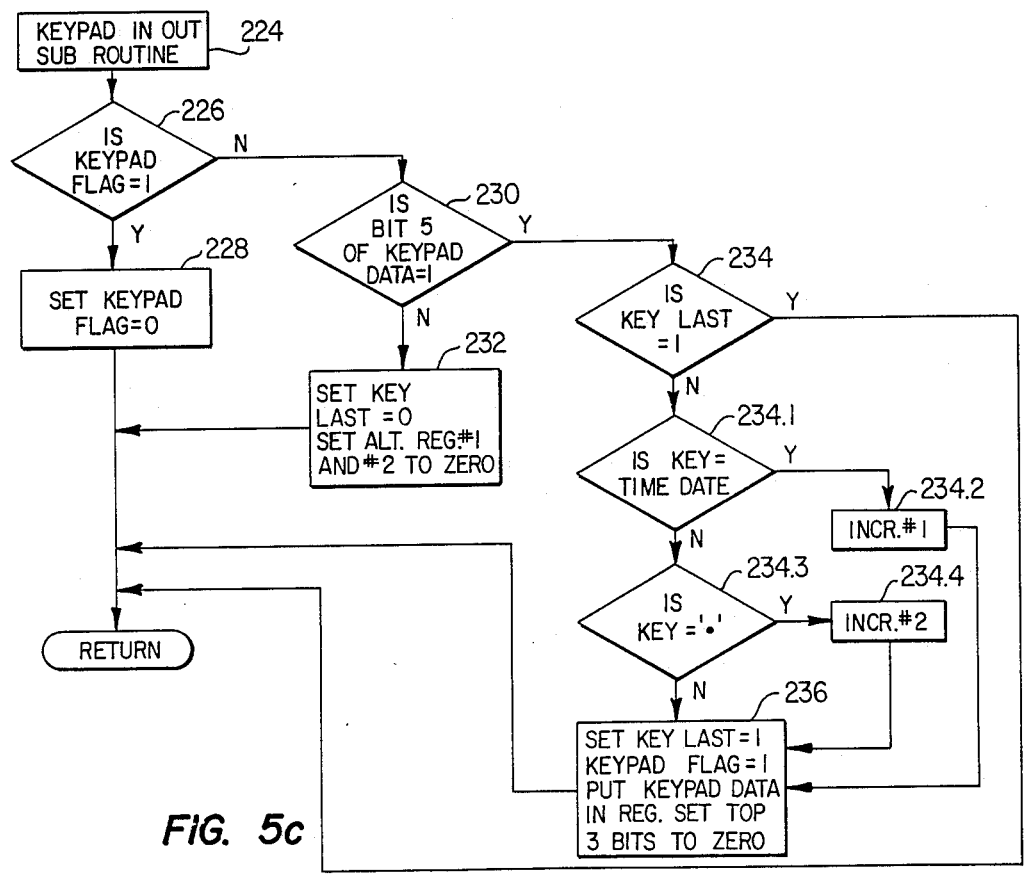
FIG. 5c

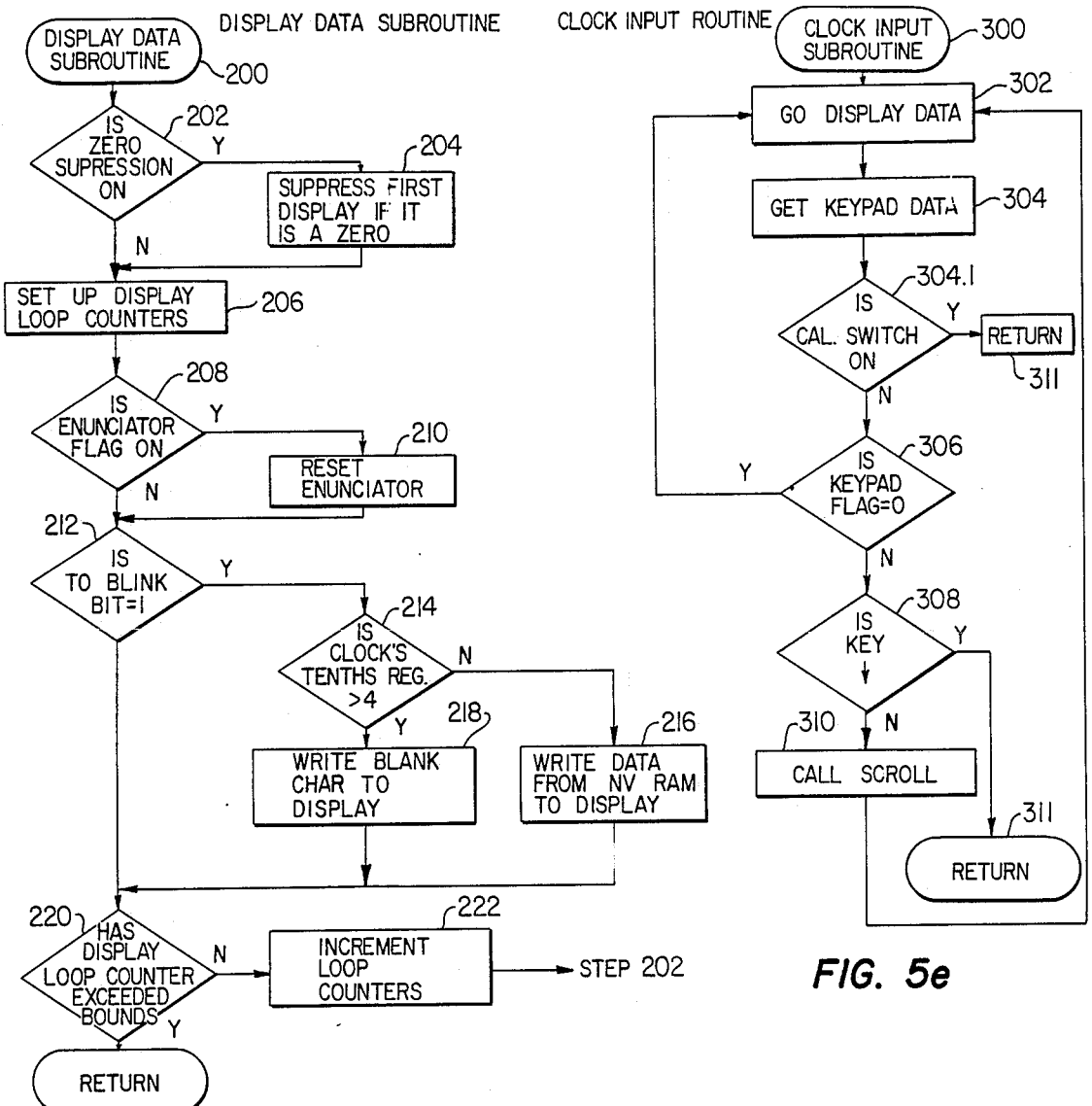
FIG. 5b
FIG. 5e
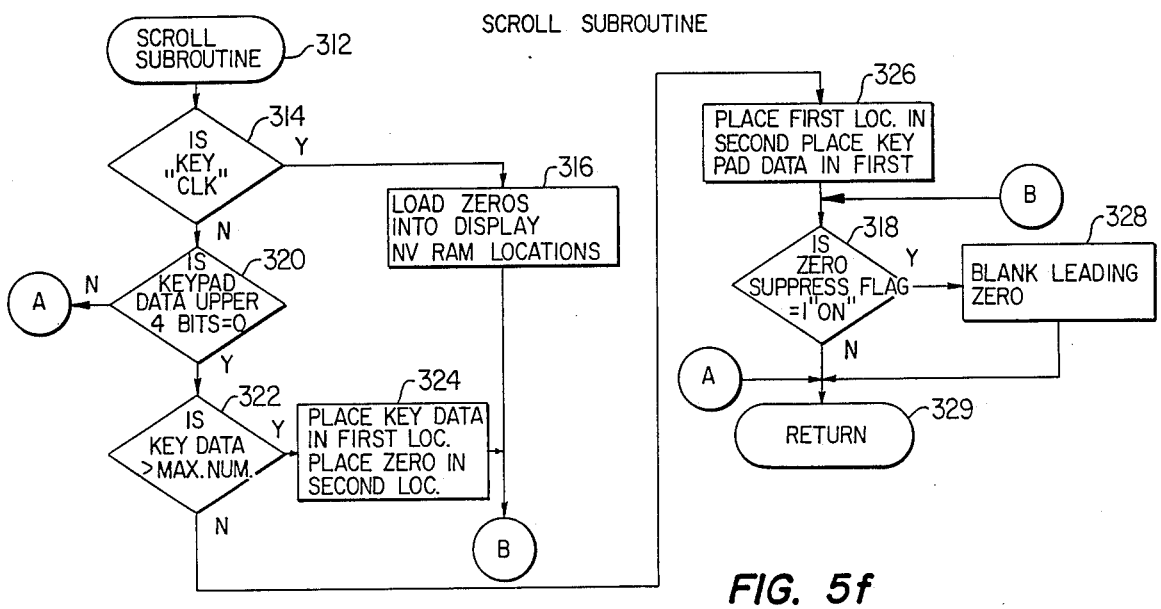
FIG. 5f

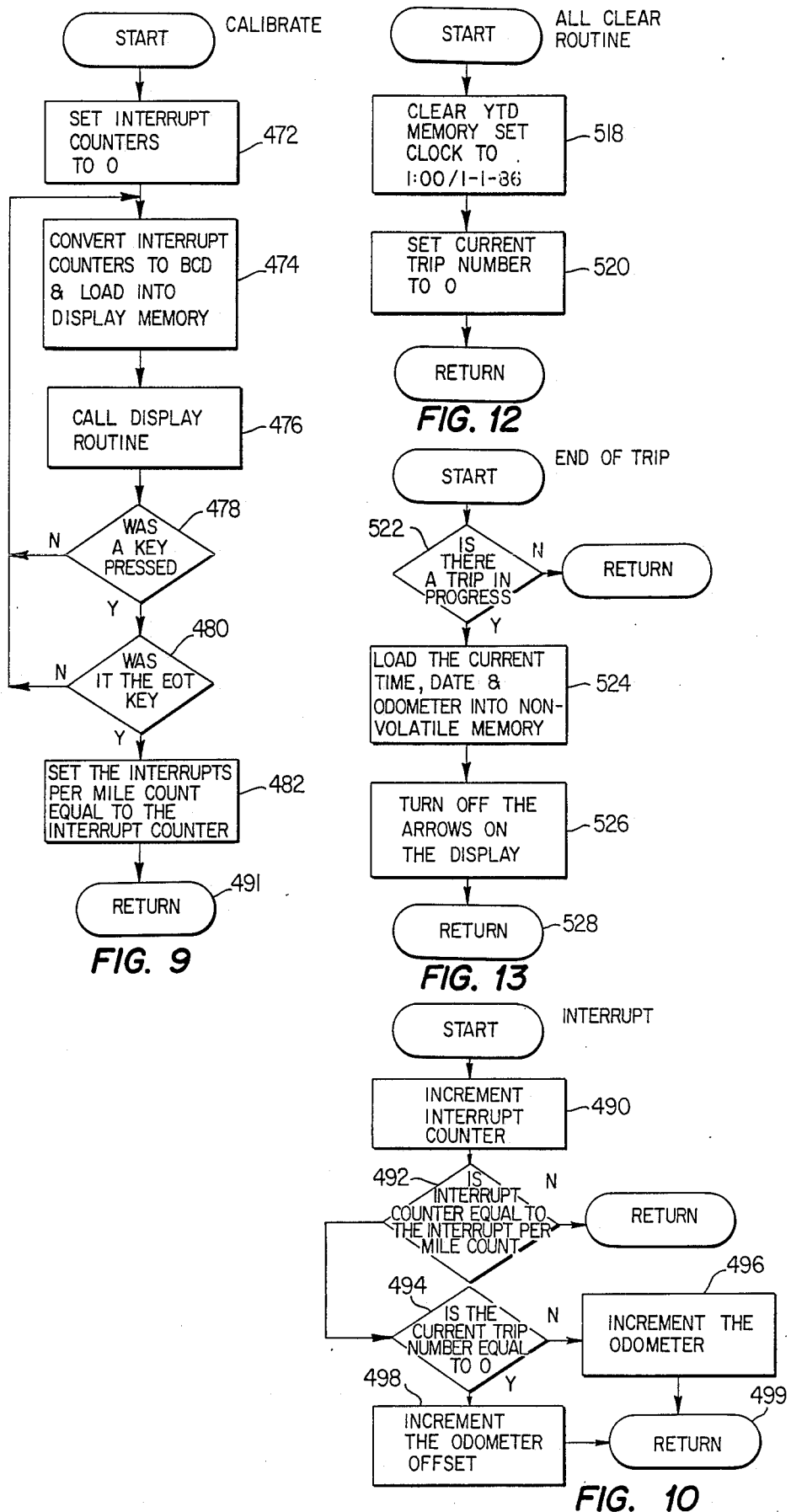

ODOMETER DATA COMPUTING APPARATUS

This application is a continuation of application Ser. No. 861,436, filed 5/9/86 abandoned.

BACKGROUND OF THE INVENTION

This invention relates to monitoring and recording systems, and more particularly to an odometer data computing apparatus.

In the past, monitoring and recording systems have utilized trip computers for recording such information as, for example, speed, mileage, temperature and time; from this data such values as fuel consumption, travelers road distance and distance to go, and estimated time of arrival has been computed using computers. A number of such vehicle trip computers are already known and described, for example, in U.S. Pat. No. 4,371,934 issued Feb. 1, 1983 to Wahl et al., for a "Vehicle Trip Computer"; U.S. Pat. No. 4,188,618 issued Feb. 12, 1980 to Wiesbart for a "Digital Tackle Graph System With Digital Memory System"; and U.S. Pat. No. 4,067,061 issued Jan. 3, 1978, to Juhasz, for a "Monitoring and Recording System for Vehicles."

The vehicle trip computers described in the above cited patents serve to improve driving comfort and safety, inasmuch as the driver can recall all desired information at any time and also enter new information by way of an input/output unit. The U.S. Pat. No. 4,067,061 patent discloses a trip record keeping apparatus meeting the requirements of the U. S. Department of Transportation (DOT). The record keeping apparatus, thus keeps records which include identifying information as to the owner or leasee of the truck, the driver's name, truck and trailer numbers, and which include such trip information as starting date and location, and ending date and location.

Further, the driver of the truck can record as required by DOT operational data such as: the beginning odometer reading, the originating State and date, the State subsequently entered and the date of entry, and the odometer reading upon entry into that State.

In addition, the driver can record the number of gallons of fuel purchased in each State on the trip, from which the number of miles traveled in the State, the amount of the purchased fuel used can be determined for obtaining tax refunds within that State.

The above described information is recorded on a tape cassette which may subsequently be processed in a computer apparatus for providing a printout of the parameters recorded on the tape.

For measuring and recording the distance traveled during the trip, a distance sensor is associated with one of the wheels of the vehicle and provides a pulse output in response to a unit of distance traveled by the wheel monitored.

The problem with these systems, including the apparatus of the U.S. Pat. No. 4,067,061, is that they are limited to the particular trip being made and thus, for end-of-year tax reporting there is no accumulative record of the business trip mileage for the current or previous year. Further, the prior art devices have no convenient means for temporarily halting the current business trip for a personal excursion trip, and then resuming the business trip. Also, the prior art has no convenient way of printing written records of the recorded information.

SUMMARY OF THE INVENTION

Accordingly, it is an object of this invention to provide an odometer data computing apparatus for recording during a preselected time, the time and date and mileage of each trip taken and the total mileage.

Another object of the invention is to provide an odometer data computing apparatus that for a preselected time period can separate business trip mileage from personal trip mileage for a report of the business trips total mileage.

Still another object of the invention is to provide an odometer data computing apparatus for recording the time, date, and mileage for each business trip made during a current preselected time period, the cumulative mileage for the current preselected time period or both, and the total business mileage for the previous preselected time period.

A further object of the invention is to provide an odometer computing apparatus with printout capability for providing written reports of each business trip taken during a preselected time period including the time and date of the trip, the beginning and end odometer readings of each trip, mileage of each trip or total mileage of the trips or both.

Briefly stated, the present invention provides an odometer data computer system for mounting in a vehicle wherein trip information for each business trip made during a preselected time period, for example, a tax reporting period, can be automatically recorded as made and accumulated in memory for the previous year and the current year. The system includes a printer for providing printouts of the business trip mileage data satisfying the United States Internal Revenue Service tax requirements.

DESCRIPTION OF THE DRAWINGS

Other objects and features of the invention will become more readily understood from the following detailed description and appended claims when read in conjunction with the accompanying drawings in which:

FIG. 1 is an isometric view of the odometer data computing apparatus;

FIG. 2 is an isometric view of the printer for the odometer data computing apparatus;

FIGS. 5a–5f constitute a flow diagram for the computer clock routines and subroutines;

FIG. 9 is a flowchart of the start trip routine;

FIG. 10 is a flowchart of a business trip interrupt routine;

FIG. 12 is a flowchart of the all clear routine;

FIG. 13 is a flowchart of the end-of-trip routine; and

DESCRIPTION OF THE PREFERRED EMBODIMENT

Referring to FIGS. 1 and 2, the automobile odometer data computing apparatus includes an odometer data computer device 10 (FIG. 1) and a printer 12 (FIG. 2).

Figure 3A:
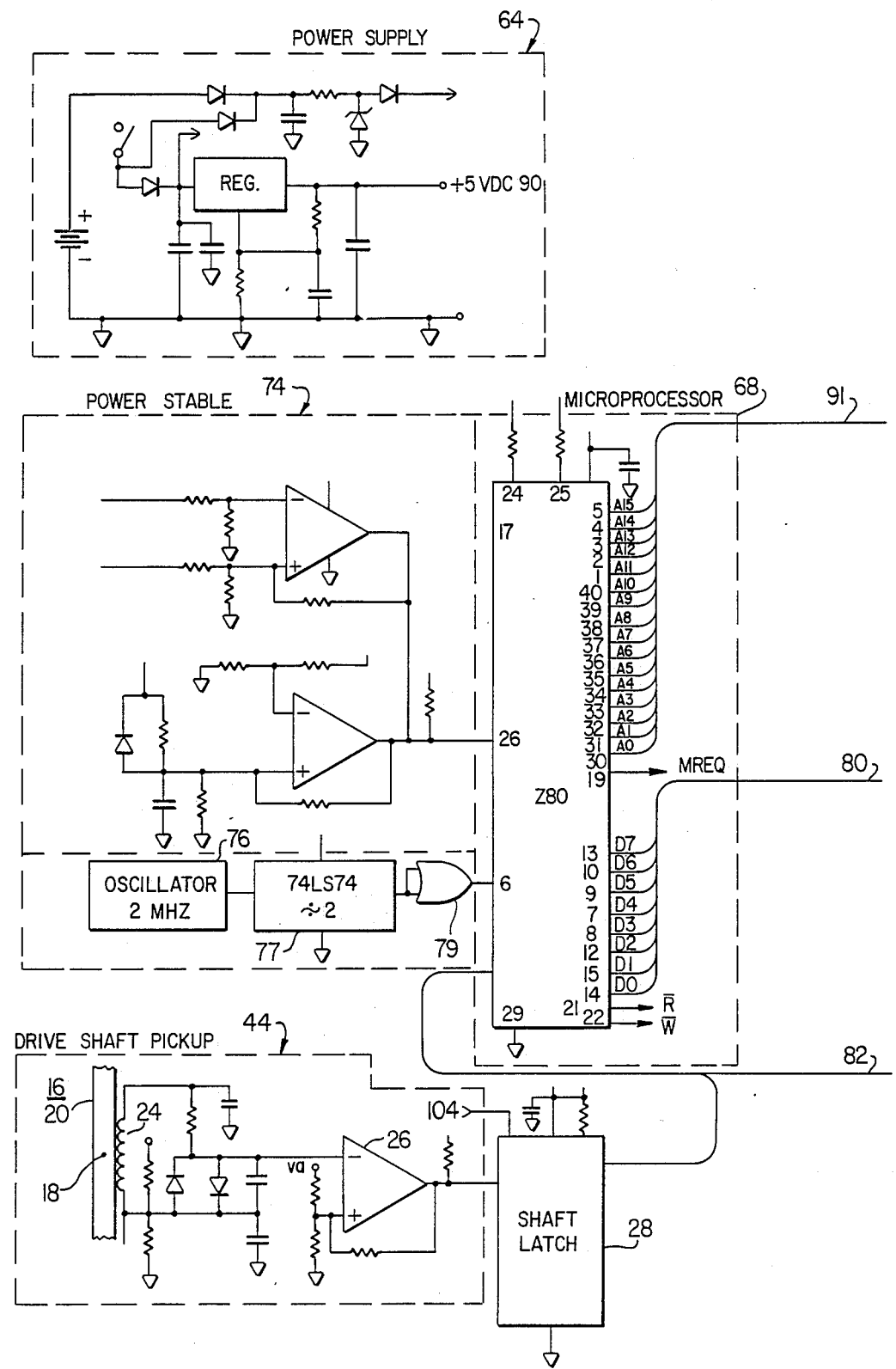
FIGS. 3a–3c constitute a schematic diagram of the odometer data computing apparatus constituting the subject matter of this invention.

The odometer data computer device receives inputs from a clock 14 (FIG. 3c) and a mileage sensor 16 (FIG. 3a). The clock is, for example, a MM58274 clock manufactured by National Semiconductor Company. The clock provides the time in hours and minutes and the dates by months, days, and years for ninety-nine years.

The mileage sensor 16 comprises a pair of magnets 18 (only 1 shown) attached to the car's drive shaft 20 180 degrees apart. A magnetic sensor 24 is attached to the car about ⅛" to ½" from the rotating magnets to form an air gap therebetween. A comparator detector 25 attached to the sensor 24 detects the magnetic power, compares the increasing magnetic power of an approaching magnet to a reference signal for determining precisely the passage of the rotating magnets for accurately determining the number of drive shaft revolutions. A latch 28 provides a corresponding pulse output for a counter which counts the number of revolutions of the drive shaft which is input to the computer for mileage calculation, hereinafter described. A suitable latch is, for example, a 74LS74 semiconductor latch sold by Texas Instruments Incorporated.

The odometer data computer device includes a keypad, liquid crystal display, microcomputer electronics and continuous memory to keep track of up to sixty trips as well as present and previous year total mileage data. The continuous memory prevents loss of important data when power is removed from the system.

The odometer data computer device 10 (FIG. 1) includes a housing 30 having walls forming apertures for the digital display 32 and the keypad 34. The display 32 is, for example, an eight digit liquid crystal display (LCD) manufactured by Optrex Incorporated.

The keypad 34 includes a plurality of keys arranged in rows 36, 38, 40, 42, and 44 and columns 46. Row 36 includes the pause/reset (PAUSE/RES), trip report (TRIP REP), year-to-date report (YTD REP), and clear (CLR) keys; row 38 includes the enter (arrow down), 1, 2, 3 keys; row 40 includes the odometer (ODOM), 4, 5, and 6 keys; row 42 includes the time/date, 7, 8, and 9 keys and row 44 includes the START, decimal point (.), zero (∅), and end of trip (EOT) keys.

Of the row 36 keys, the pause/reset key is used only when a business trip is in progress. When during a business trip a personal trip is going to be made, it is pressed to halt the business trip; when pressed again the business trip is resumed. The trip report key is pressed to print accumulated trip reports; the year-to-date (YTD) key is pressed to print total business trip mileage for the year. The clear key when pressed clears any errors; it is also used to reset display to 0's when entering data.

The 0 through 9 keys are used to enter clock and odometer setting data.

The down arrow key is used in conjunction with the time/date, which toggles the unit between a time or date mode of operation, to place in a time or date setting; it is also used in the odometer mode to enter odometer data.

The odometer (ODOM) key is used to place the unit in the odometer mode. The start key is used to start a trip; it is also used in the calibration mode to begin odometer calibration. The end-of-trip (EOT) key is used to end a trip; it is also used in the calibration mode to end calibration of the odometer after exactly one mile has been driven. The period (.) key is used to toggle between AM/PM in the clock setting mode, and between present year or previous year-to-date report mode.

A printer connector 46 is mounted in the back side of the housing 30 for connecting the computer to the printer 12 (FIG. 2). A power switch 48 and a calibration switch 50 are mounted on the left side of the housing 30 (FIG. 1). The power switch connects the power source (car battery) to the computers power supply. While the calibration switch when ON places the unit in the odometer calibration mode, as well as the master clear mode; it is usually left in the OFF position after odometer calibration hereinafter described.

The printer 12 (FIG. 2) includes a housing 52 on which is mounted a connector 54 for connecting the printer to the computer 10 (FIG. 1).

A power switch 56 is provided for turning the printer ON and OFF. A paper access cover 58 is removable for changing paper rolls, and a paper tear 60 is provided at the paper output slot. A paper feed switch 62 is used to feed the paper from the roll through the output slot. A suitable printer is, for example, a SEIKO MTP 201-24 printer.

The printer 12 is used to print permanent printed records of automobile business trips and yearly business total mileage. The printer is easily disconnected from the computer so that it can be stored when not in use, or used, for example, on other vehicles carrying the computers only. The printer is actuated by pressing the appropriate keypad keys of the computer to print out recorded trip data. It will be appreciated by those skilled in the art that the printer 12 can be combined with the odometer computer device in housing 30 (FIG. 1).

Figure 3B:
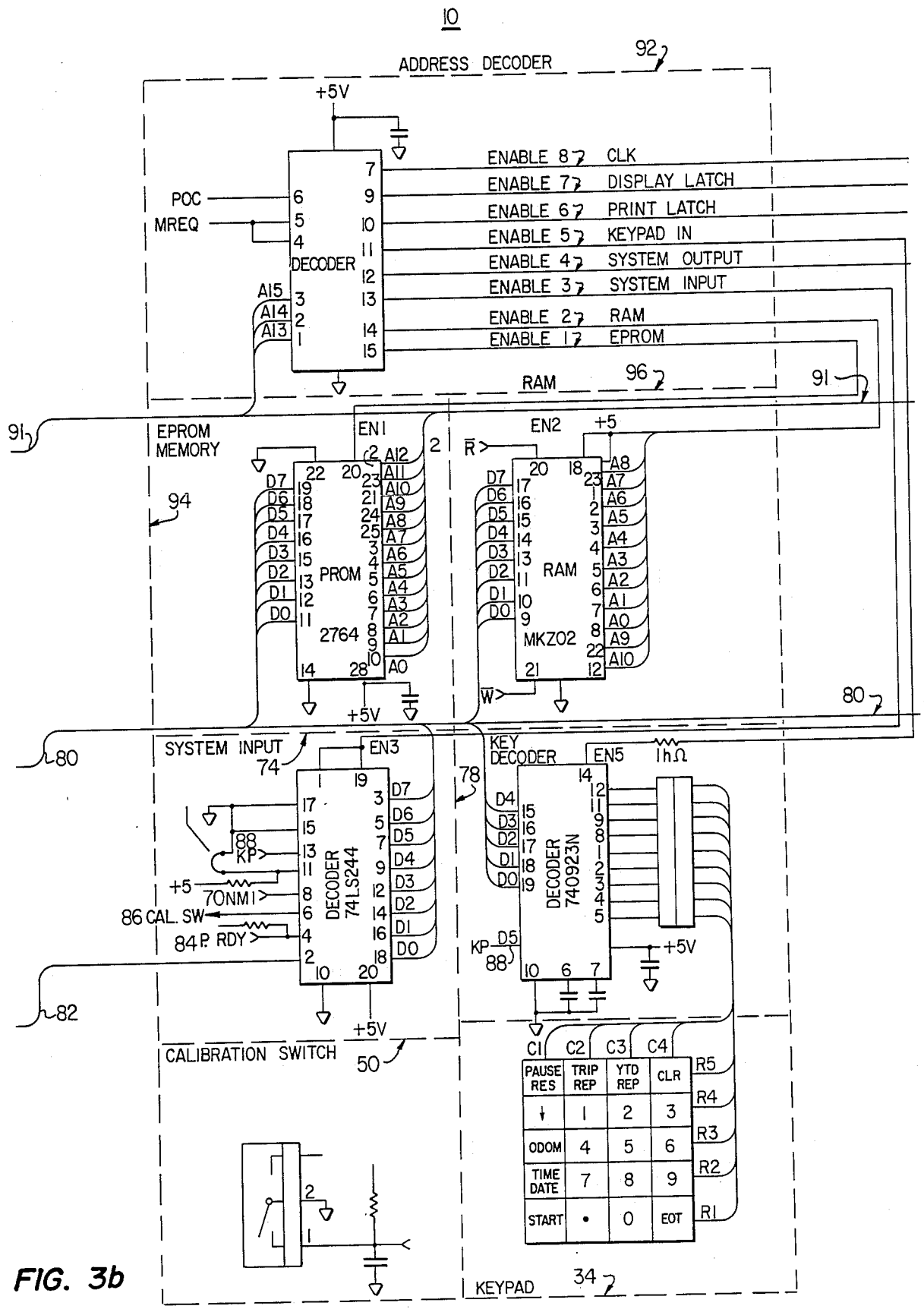
Figure 3C:
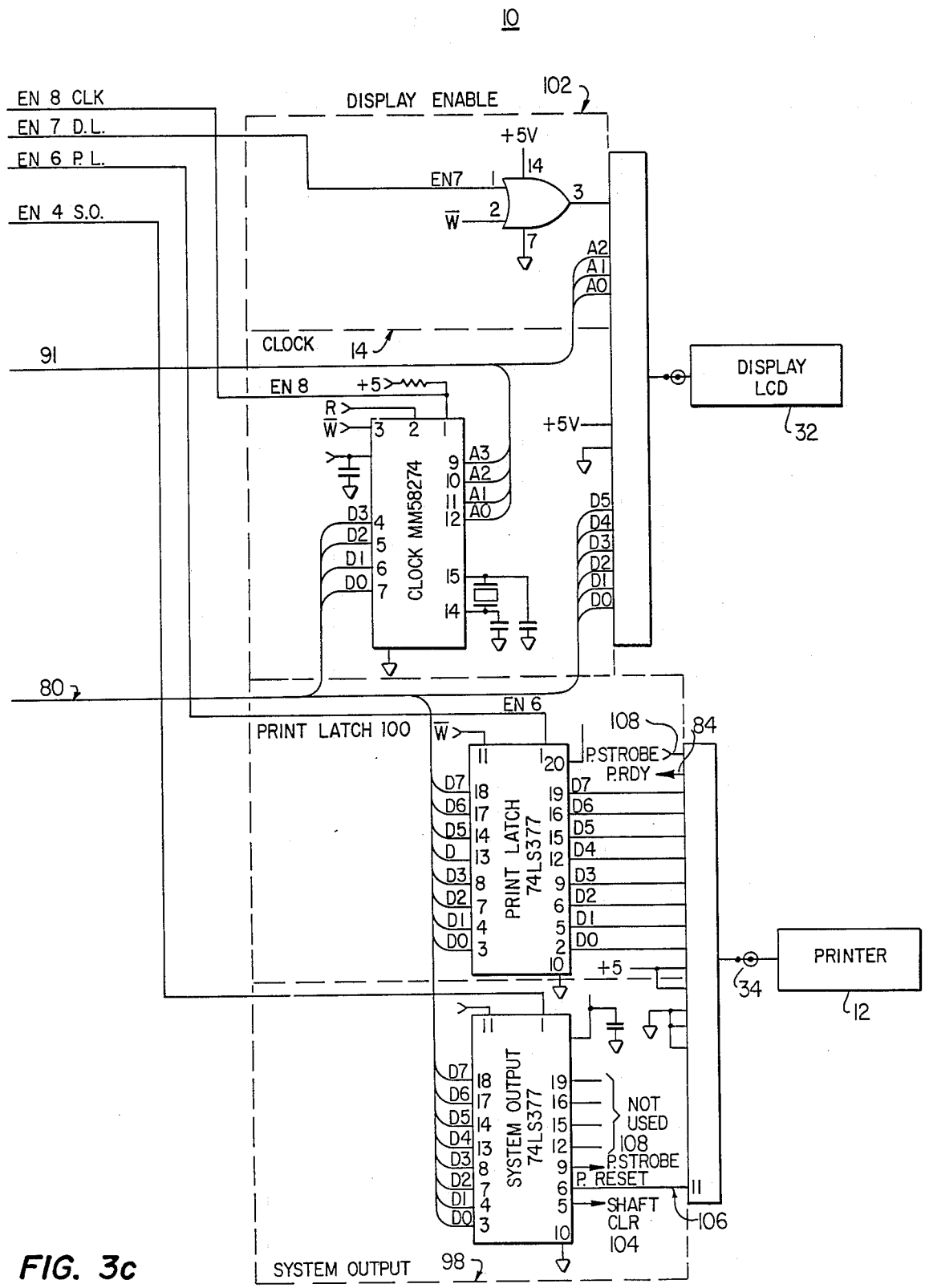

Referring now to FIGS. 3a–3c, the computing means 10 includes a power supply 64 (FIG. 3a) which at ignition turn on operates off the 12 V car battery to provide a stable +5 V DC voltage.

To protect the system from transient voltages and to insure a stable +5 V power supply, a power stable circuit 74 (FIG. 3a) is connected to the microprocessor 68.

An oscillator 76 connected to a divide by 2 divider 77 provides a 1 MHz frequency signal to OR gate 79 as a clock for the microprocessor 68.

The microprocessor 68 (FIG. 3a), pursuant to its read terminal (R), receives on data terminals D0–D7 inputs from the keypad 34 (FIG. 3b). The keypad 34 keys are connected in rows by leads R1–R5 and in columns by leads C1–C4. Thus, it will be readily apparent, that pressure on any key engages a corresponding row lead and column lead to identify the key, and by continuously scanning the rows and columns of keys, the pressed key is identified by key decoder 78. The key decoder, is for example, a 74C923N encoder/decoder manufactured by National Semiconductor Incorporated having input terminals 1–5 connected to keypad row leads R-1-R-5 and input terminals 8, 9, 11, and 12, connected to keypad column leads C1–C4. The key decoder 78 decodes the pressed key signal and outputs a binary coded number indicative of the key pressed in the keypad. When enabled the key decoder outputs the binary numbers on its terminals through D0–D4 output bus 80 to corresponding data pins (D0–D4) on the microprocessor 68 (FIG. 3a) for writing in response to a write (W) signal into a random access memory (RAM) 96, display by display 14 (FIG. 3c) and printer 12 as appropriately enabled.

The system input decoder 74, (FIG. 3b) which is, for example, a 74LS244 decoder manufactured by Monolithic Memories Inc., has its input terminal 2 connected by lead 82 to the output of shaft latch 28 (FIG. 3a), input 4 connected by lead 84 to receive a print ready signal from the printer 12 (FIG. 3c), output 6 connected by lead 86 to calibration switch 50 (FIGS. 1 and 3a), input 8 connected by lead 70 to receive, if required, non-maskable interrupt signal from the power down sense circuit 66, input 13 connected by lead 88 to the keypad output terminal of the key decoder 60, and inputs 11, 15, and 17 connected by lead 90 to the power supply 64 (FIG. 3a). When enabled the system input decoder outputs data signals (D0-D5), respectively, as follows: shaft latch, printer ready, calibration switch, non-maskable interrupt (NMI), test mode signal, and keypad signal. The D0-D7 outputs are connected through bus 80 to the microprocessor 68.

The calibration switch 50 (FIG. 3b) is used in the calibration of the computing means to the car's odometer for accurate mileage determinations.

The microprocessor 68 (FIG. 3a), which is, for example, a Z80 manufactured by Zilog Inc., (FIG. 3a) has address terminals A0-A15, selectively connected by lead 91 to an address decoder 92 (FIG. 3b), an erasable programable read only memory (EPROM) 94, the random access memory 96, the clock 14 (FIG. 3c), and the eight digit liquid crystal display (LCD) 32 as follows. The A13-A15 addresses are connected to the address decoder 92; the A0-A12 addresses are connected to the EPROM memory 94, the A0-A10 addresses are connected to the RAM 96, the A0-A3 addresses are connected to the clock 14 (FIG. 3c), and the A0-A2 addresses are connected to the eight digit LCD 32.

The address decoder 92 (FIG. 3b) may be for example, a 74LS138 decoder manufactured by Radio Corporation of America.

The outputs of the address decoder are enable signals 1-8 connected as follows: enable 1 to the EPROM 94, enable 2 to the RAM 96, enable 3 to the system input decoder 74, enable 4 to the system output flipflop 98 (FIG. 3c), enable 5 to the key decoder 78 (FIG. 3b), enable 6 to the print latch 100 (FIG. 3c), enable 7 to the display enable 102, and enable 8 to the clock 14.

When enabled by an enable 1 signal the EPROM 94 (FIG. 3b), which is a C2764 manufactured by Intel Corp., has its data terminals D0-D7 connected to the microprocessor 68 through bus 80. Similarly, when enabled by enable signals 2, 3, 6, 4, respectively, the RAM memory 96, which is, for example, an MK48Z02 with a lithium battery back up, 2 K by 8 bit memory manufactured by Mostek Inc., the system input decoder 74, the print latch 100 (FIG. 3c) and system output latch 98 (both 74L5377s manufactured by RCA) have their data terminals D0-D7 connected through bus 80 to the microprocessor 68. While the key decoder 78 (FIG. 3c) and the clock 14 (FIG. 3c) when enabled by enable signals 5 and 8, respectively, have their data terminals D0-D4 and D0-D3 connected through bus 80 to the microprocessor 68.

The eight digit LCD 32 has input terminals D0-D5 connected to bus 80 to receive the data outputs of data terminals D0-D5 from the microprocessor 68.

The EPROM memory 72 (FIG. 3b), system input decoder 74, and the key decoder 78 are inone way communication (R) to the microprocessor 68; while the print latch 100 (FIG. 3c) and system output latch 98 are in one way communication (W) from the microprocessor; and the RAM 96 and clock 14 are in two way communication (R, W) with the microprocessor 38.

The display enable 102 is an OR gate having one input terminal connected to the enable 7 output of the address decode 92 (FIG. 3b) and its other input terminal connected to the low write (W) enable output of the microprocessor 68 (FIG. 3a). The output of the display latch OR gate (FIG. 3c) is to the eight digit LCD 32.

The system output latch 98 has output pins 5, 6, and 9 connected by lead 104 to the clear terminal of drive shaft pick up latch 28 (FIG. 3a), by lead 106 to printer reset (FIG. 3c), and by lead 108 to the printer strobe. The remaining output terminals 12, 15, 16, and 19 are not used. Finally, the printer latch 100 has output pins 2, 5, 6, 9, 12, and 15 connected to data terminals D0-D5 to the printer module for providing data to be printed.

MICROPROCESSOR PROGRAMS

The odometer data computer operation is controlled by the computer 68 by execution of programs stored in the EPROM 94 and using storage areas of rewritable RAM 96. Data for each business trip of the current year and total mileage (personal and business) for the current and previous year are stored in RAM 96. The principal programs stored in EPROM 94 for data handling will now be discussed in connection with the flowcharts of FIGS. 4, 5a-5f, 6a and 6b, 7, 8, 9a and 9b, 10, 11, and 12.

SYSTEM ROUTINES

Figure 4:
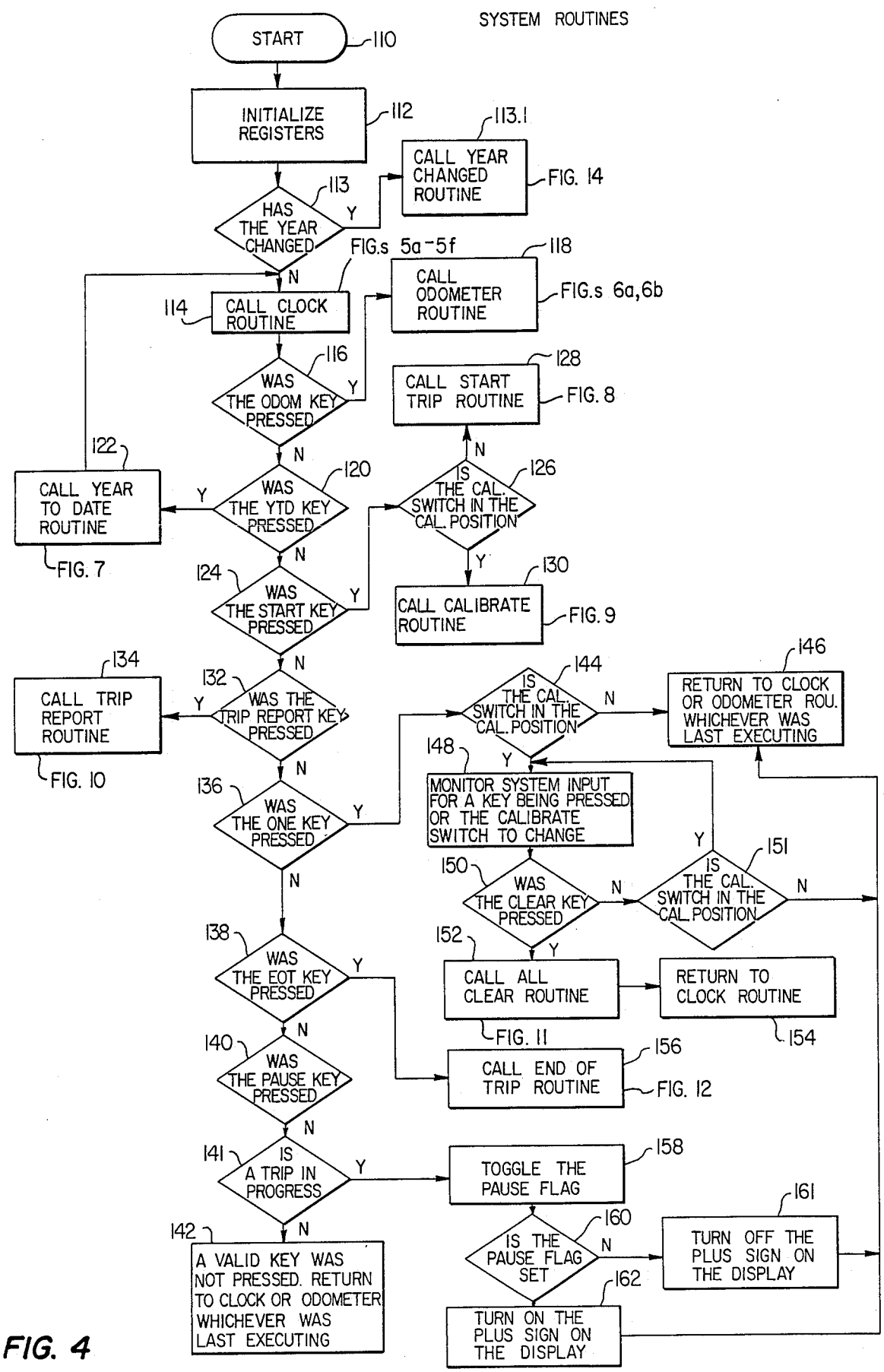
FIG. 4 is a flow diagram for the system routines.

Referring now to FIG. 4, the odometer data computer system flowchart starts 110 with an instruction 112 to initialize the microprocessor at ignition turn on of the vehicle. When instruction 113 is issued to determine if the year has changed, if yes, then the year changed routine is called; if no, then an instruction 114 is issued to recall the clock routine (FIGS. 5a-5f). Return from the clock routine return terminal is made by pressing a key not used in the clock return, and a decision 116 is made as to whether the odometer (odom) key was pressed. If yes, an instruction 118 is issued to call in the odometer routine (FIG. 6a); if no, a decision 120 is made as to whether the year-to-date key was pressed.

If the YTD key was pressed, an instruction 122 is issued to call in the YTD routine (FIG. 7) and then return is made to the call clock routine 114. If the YTD was not pressed, a decision 124 is made whether the start key was pressed. If yes, the start key was pressed, a decision 126 is made as to whether the calibrate switch is in the calibrate position. If yes, an instruction 130 is issued calling for the calibrate routine (FIG. 8); if no, an instruction 128 is made to call for the start trip routine (FIG. 9). [When a magnet is detected to have moved past the pickup, the microprocessor is interrupted using an interrupt routine (FIG. 10)].

Figure 11:
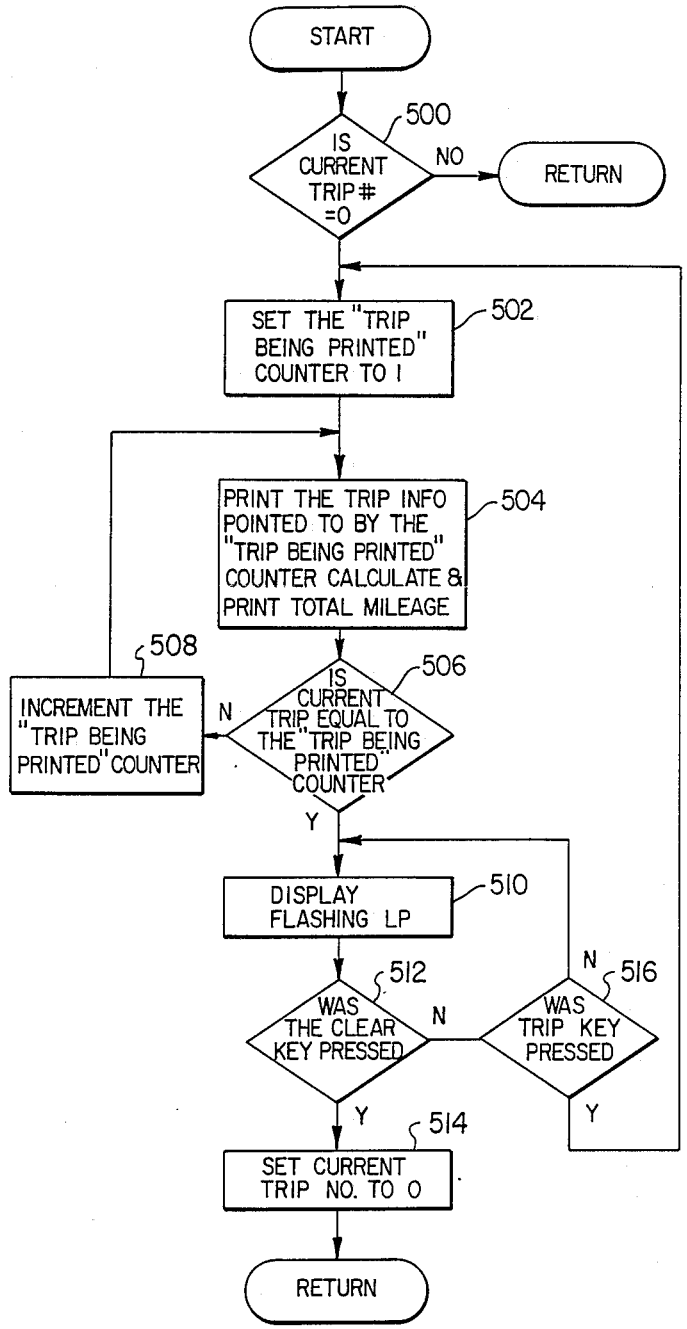
FIG. 11 is a flowchart of the trip report routine.

Returning to the decision 124 (FIG. 4), if the answer was no, the start key was not pressed, then a decision 132 is made whether the trip report key was pressed. If yes, an instruction 134 is issued calling for the trip report routine (FIG. 11). If no, a decision 136 is made whether the one key was pressed. If the one key was not pressed, decisions 138, and 140 are made, respectively, as to whether the end-of-trip (EOT) or the pause key were pressed. If the answers were no, then an instruction 142 is issued that no valid key was pressed and to return to either the clock or odometer routines whichever was last executing.

Returning to the decision 136 as to whether the one key was pressed, if yes, a decision 144 is made as to whether the calibrate switch is in the calibrate position. If the answer is no, an instruction 146 is issued to return to the clock or odometer routines, whichever was last executing. If the answer is yes, an instruction 148 is issued to monitor the keypad for a key being pressed or the calibrate switch being changed, and a decision 150 is made whether the clear key was pressed; if yes, instructions 152 and 154 are issued, respectively for calling in the all clear routine (FIG. 11) and for returning to clock routine 114; if no, then decision 151 is made to see if the calibrate switch is in the calibrate position; if yes, return is made to the monitor system step 148, if no, then return is made to 146.

Returning to decision 138 as to whether the EOT key was pressed; if yes, an instruction 156 is issued for calling in the EOT routine (FIG. 13).

Returning to the decision 140, as to whether the pause key was pressed; if yes, decision 141 is made to determine if a trip is in progress; if no, return is made to 142; if yes, an instruction 158 is issued to toggle the pause flag, and a decision 160 made as to whether the pause flag is set. If no, an instruction 161 is issued to turn off the plus sign on the display; if yes, an instruction 162 is issued to turn on the plus sign on the display and return to the clock or odometer routine whichever was last executing.

Having completed the relationship of the principal routine, each principal routine flowchart will now be described together with its principal subroutine flowcharts, if any.

CLOCK ROUTINE

Figure 5A:
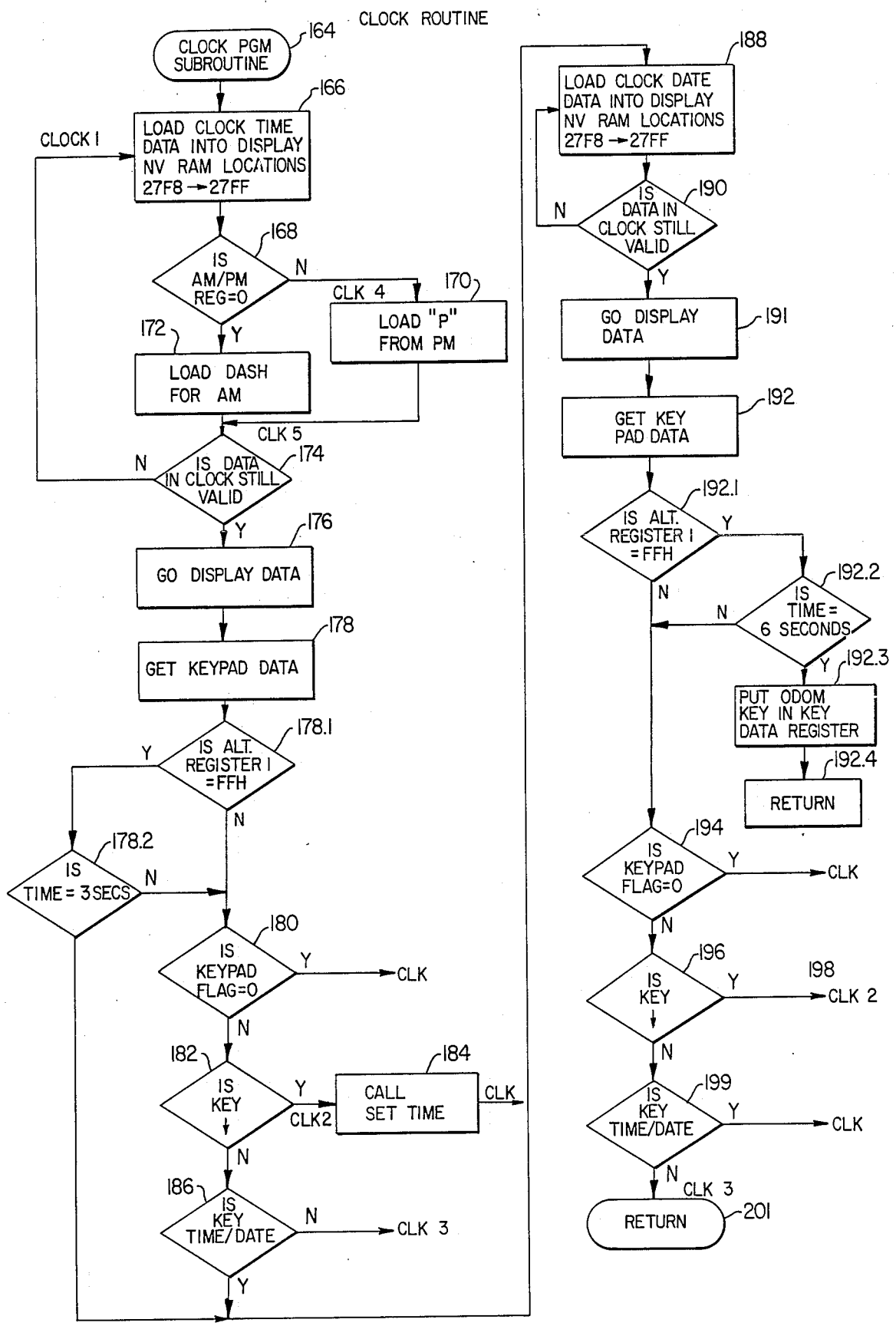

Referring now to FIG. 5a, the microprocessor's clocking routine for providing the time in hours and minutes, AM and PM, and date information in months, days, and years for the trip report includes a clocking routine having a display data subroutine (FIG. 5b), a keypad input subroutine (FIG. 5c), a set time subroutine (FIG. 5d), a clock input subroutine (FIG. 5e), and a scroll subroutine (FIG. 5f).

The clock flowchart at start 164 (FIG. 5a) issues an instruction 166 (clock 1) to load the clock time data from the clock into the random access memory (RAM) for display, and a decision 168 is made whether the AM/PM register is 0. If no, an instruction 170 is issued to load a "P" and proceed to decision 174; if yes, an instruction 172 is issued to toggle the period key to load a dash for AM.

After completion of the above steps a decision 174 is made as to whether the clock time is still valid. If no, a return is made to the load clock step 166, if yes, an instruction 176 is issued to call in the display data subroutine (FIG. 5b) to display the data and then an instruction 178 is issued to call in the keypad input subroutine (FIG. 5c) to get any keypad data. Next, the alternating register is checked and a decision 178.1 made whether it has an FFH. If not, a decision is made to proceed to 180. If yes, the time is checked and a decision 178.2 made whether it is at 3 seconds. If yes, proceed to 188; if not then to 180.

Next, the keypad flag is checked and a decision 180 made whether the keypad flag is 0, that is, has a new entry been made. If yes, a return to load clock 166 is made; if no, a decision 182 is made whether the arrow down (enter) key has been pressed. If yes, an instruction 184 is issued to call in the set time subroutine after which return is made to the instruction 166 load clock; if no, a decision 186 is made whether the time/date key has been pressed. If no, return is made on return terminal 201 to the odometer routine; if yes, an instruction 188 is issued to load clock date data into the RAM and a decision 190 made whether the data in the clock is still valid. If no, return is made to the load date data instruction 188, if yes, instructions 191 and 192 are issued to call in once again the display data subroutine (FIG. 5b) and the keypad data subroutine (FIG. 5c), respectively. Alternating register is again checked and a decision 192.1 made whether it has an FFH. If yes, the the time is checked and a decision 192.2 made whether it is 6 seconds. If it is, then an instruction 192.3 is issued to put odometer key in key data register and a return is executed at 192.4. If no, a decision 194 is made whether the keypad data is 0. If yes, then return is made to the load clock date data 166; if no, a decision 196 is made whether the arrow down (enter) key had been pressed. If yes, an instruction 198 is issued to call in the set time subroutine (FIG. 5d) and return to the load clock time data step 166. If the decision is no, then a decision 199 is made whether the time/date key has been pressed. If yes, return is made to the load clock time step 166; if no, return is made to the odometer routine.

Referring now to FIG. 5b, the display subroutine at start 200 makes a decision 202 whether the display 0 suppression is on. If yes, an instruction 204 is issued to suppress the first display digit if it is a 0 and proceed to instruction 206; if no, an instruction 206 is issued to set-up the display loop counters and a decision 208 made whether the enunciator flag is on. If yes, an instruction 210 is issued to reset the enunciator and proceed to decision 212; if no, a decision 212 is made whether the blink bit is a 1. If yes, a decision 214 is made whether the clocks tenths register is greater than 4. If no, an instruction 216 is issued to write data from the RAM into the display and proceed to decision 220. If yes, an instruction 218 is issued to write a blank character into the display and proceed to decision 220. Next, the decision 220 is made whether the display loop counter exceeded its maximum number bounds for display. If no, an instruction 222 is issued to increment counters and return to the 0 suppression decision step 202; if yes, return is made to the clock 1 (FIG. 5a).

Referring now to FIG. 5c, the keypad input subroutine starts 224 with a decision 226 as to whether the keypad flag is set equal to 1. If yes, an instruction 228 is issued to set keypad flag to 0 and return to clock routine on return terminal 229; if no, a decision 230 is made whether bit 5 of the keypad data is equal to 1. If no, an instruction 232 is issued to set the last key pressed to 0 and set alternating registers 1 and 2 to zero and return on return terminal 229; if yes, a decision 234 is made whether the last key is set to a 1. If yes, return is made on return terminal 229; if no, a decision 234.1 is made whether the key is a time/date key. If it is, then an instruction 234.2 is issued to increment register 1 and proceed to instruction 236. If no, a decision 234.3 is made whether the key is a period. If yes, then an instruction 234.4 is made to increment register 2 and proceed to instruction 236. If no, an instruction 236 is issued to: set the last key to a 1, the keypad flag to a 1, put keypad data into the register, set top 3 bits to 0, and return to terminal 229.

Figure 5D:
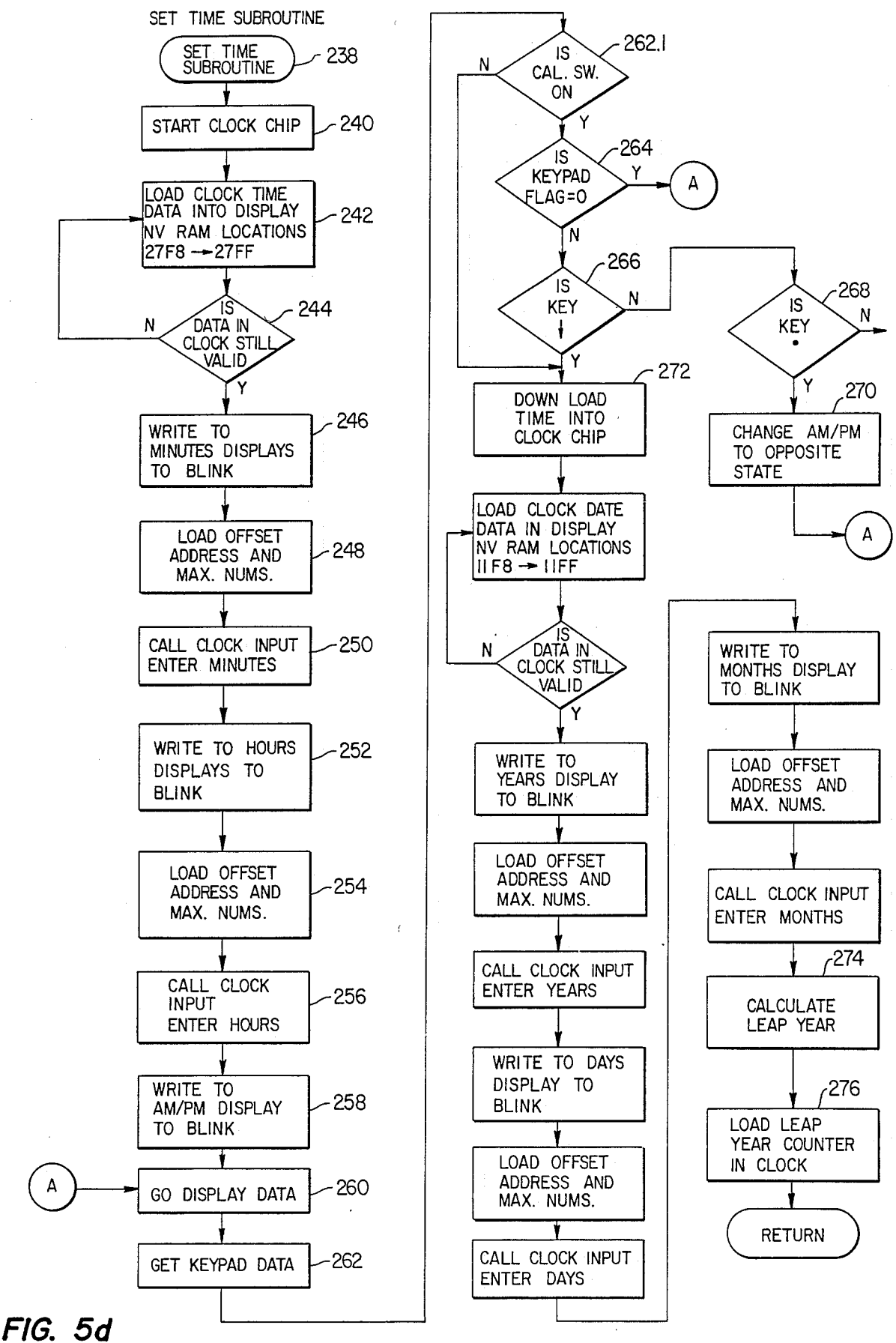

Referring now to FIG. 5d, the set time subroutine starts 238 with instructions 240 and 242 to start clock chip and load clock time data into RAM, and a decision 244 is made as to whether the time data is still valid. If no, return is made to the load clock time instruction 242. If yes, instructions 246 and 248 are issued, respectively, to blink the minute display, and to load the offset address and the maximum number for minutes at fifty-nine. Next, an instruction 250 is issued to call in the clock input subroutine (FIG. 5e) to enter the minutes.

Then instructions 252 and 254 are issued, respectively, to blink the hours display and to set the maximum number to 12 for 12 hours AM and PM operation. Next, a call 256 is made for the clock input subroutine (FIG. 5e) to enter the hours. Instructions 258, 260, and 262 are then issued, respectively, to blink the AM/PM display, call in the display data subroutine (FIG. 5e), and call in the keypad entry subroutine (FIG. 5c), successively. Next, a decision 262.1 is made whether the calibration switch is on. If no, then proceed to instruction 272; if yes, then a decision 264 is made whether the keypad flag is 0. If yes, the keypad flag is on, return is made to the display data subroutine instruction 260; if no, a decision 266 is made whether the down arrow (enter) key has been pressed. If no, a decision 268 is made whether the period (.) key has been pressed; if no, return is made to the "go display data" instruction 200; if yes, an instruction 270 is issued to change the state of AM/PM and return to the display instruction 260. If the above decision 266 is yes, an instruction 272 is issued to down load the hours into the clock chip 14.

Then the instructions are continued to load the years (maximum number 99), days (maximum number 31) and months (maximum number 12) into the memory. As these instructions are identical to those for entering the time down to final instructions 274 and 276, they are not repeated. After the years, days, and months have been entered, the final instructions 274 and 276 are issued to calculate, respectively, the year and if a leap year, to load the leap year counter into the clock and return to clock 1, FIG. 5a.

Referring now to FIG. 5e, the clock input subroutine at start 300 issues instructions 302 and 304, respectively, to display the data and to monitor the keypad. Then, a decision 304.1 is made to determine if the calibration switch is on; if yes, then terminal 311 is executed. If no, then a decision 306 is made whether the keypad flag is 0; if yes, return is made to the display data instruction 302; if no, a decision 308 is made whether the down arrow (enter) key has been pressed. If yes, return is made on terminal 311 to the blink display instructions 252, 256, etc. as appropriate (FIG. 5d); if no, a call 310 is made for a scroll subroutine and return to the "go display date" step 302.

Referring now to FIG. 5f, the scroll subroutine starts 312 with a decision 314 as to whether the clear key has been pressed. If yes, an instruction 316 is issued to load 0's into the memory and proceed to decision 318; if decision 314 is no, a decision 320 is made whether the keypad data upper four bits are 0 (is then a number). If no, a return is made on return terminal 329 to clock input subroutine (FIG. 5e); if yes, a decision 322 is made whether the key data is greater than the maximum number. If decision 322 is yes, an instruction 324 is issued to place key data in the first location and place a 0 in the second location and to proceed to decision 318; if no, an instruction 326 is issued to move the number in the first location to the second location and place the keypad data in the first location and the decision 318 is made as to whether the 0 suppress flag is on. If yes, an instruction 328 is issued to blank the leading 0 and return on return terminal 329 is made to the clock input subroutine; if no, return is made on return terminal 329 to the clock input subroutine (FIG. 5e).

ODOMETER ROUTINE

Figures 6A, 6B:
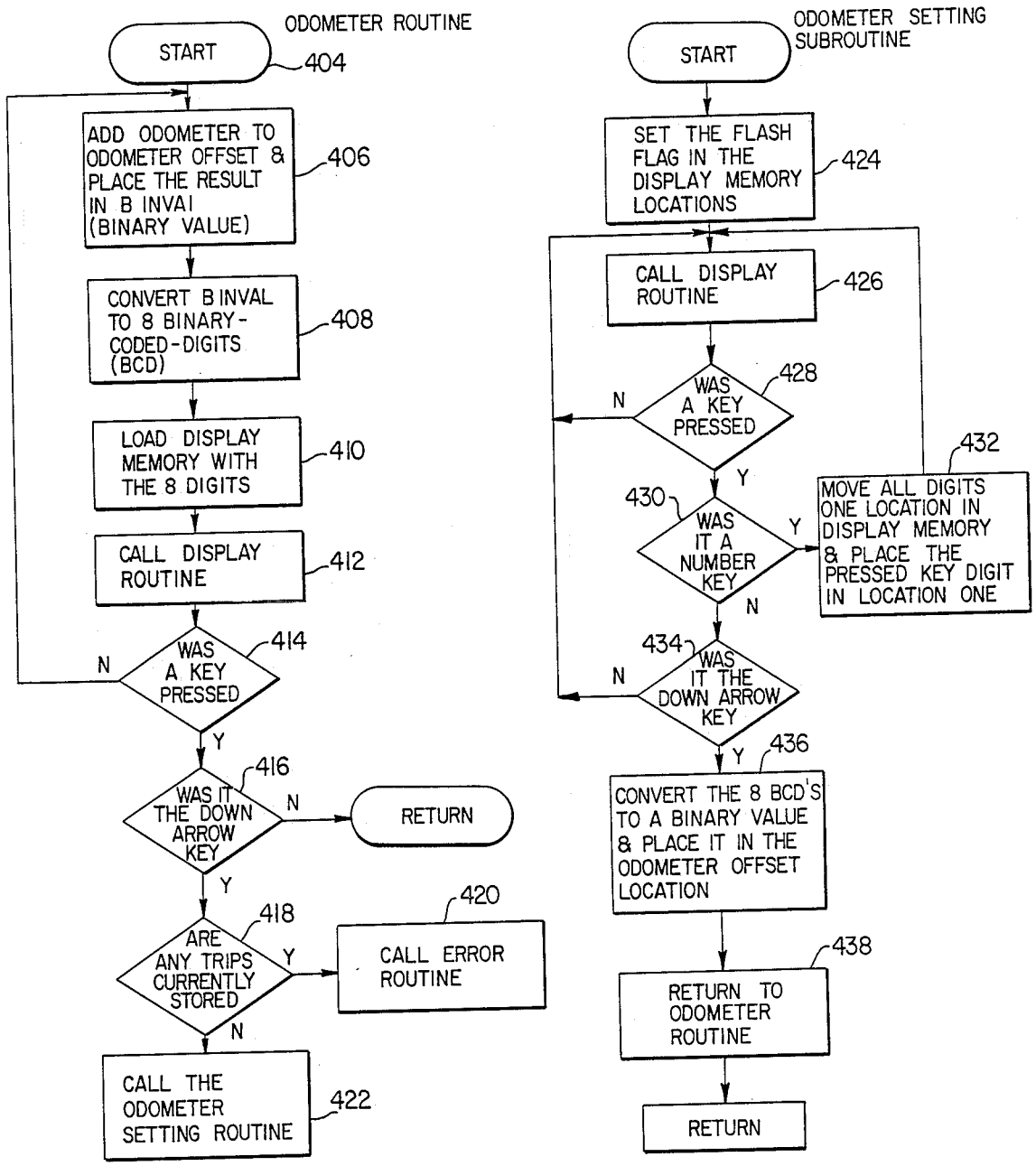
FIGS. 6a and 6b constitute a flow diagram for the odometer routine and subroutine.
Figure 7:
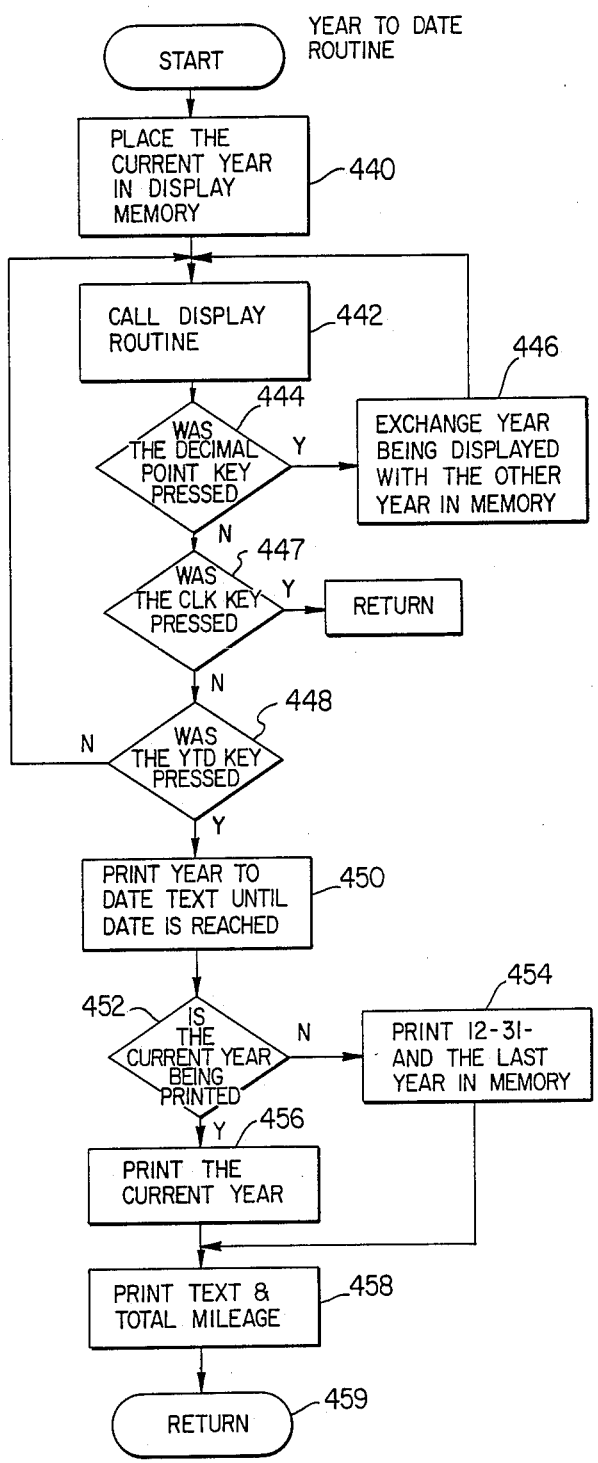
FIG. 7 is a flowchart for the year-to-date routine.

Referring now to FIGS. 6a and 6b, the odometer routine (FIG. 6a) starts 404 with instructions 406, 408, 410, and 412 being issued, respectively, to add the odometer mileage to the odometer offset mileage and to place the result in binary value (BINVAL), convert the BINVAL to 8 binary coded digits (BCD), load the display memory with the eight digits, and call in the display subroutine (FIG. 5b).

After return from the display subroutine, a decision 414 is made whether a keypad key has been pressed; if no, a return to start 404 is made; if yes, a decision 416 is made whether it was the down arrow (enter) key. If no, it was not the enter key, return is made to the odometer decision 114 (FIG. 4); if yes, it was the enter key, a decision 418 is made as to whether any trips are currently stored in memory. If yes, trips are currently stored, an instruction 420 is issued to call in the error subroutine to provide blinking E's and a 1 on the display; otherwise an instruction 422 is issued calling in the odometer setting subroutine (FIG. 6b).

The odometer setting subroutine (FIG. 6b) starts with instructions 424 and 426, respectively, to set the flash flag in the display memory locations and to call in the display subroutine (FIG. 5b). After return from the display subroutine, a decision 428 is made whether a key has been pressed; if no, return is made to the call display instruction 426; if yes, a decision 430 is made whether it was a number key. If yes, an instruction 432 is issued to move all digits one location in the display memory and place the addressed key in location one; after which return is made to the call display subroutine 426. If no, it was not a number key, a decision 434 is made whether it was the arrow down (enter) key; if not, return is made to the call display routine 426; if yes, instructions 436 and 438 are issued, respectively, to convert the 8 BCD's in the display memory to a binary value (BINVAL) and place it in the odometer offset RAM location and to return to the odometer routine (FIG. 6a).

YEAR-TO-DATE ROUTINE

Referring to the year-to-date (YTD) routine (FIG. 7) which starts with instructions 440 and 442, respectively, to place the current year in the display memory and to call in the display routine (FIG. 5b) respectively. After return from display routine, a decision 444 is made whether the decimal point (.) key was pressed; if yes, an instruction 446 is issued to exchange the year being displayed with the other year in memory and return to the call display instruction 442; if no, a decision 447 is made whether the clock key was pressed; if yes, return to clock routine step 114 (FIG. 4); if no, a decision 448 is made whether the YTD key was pressed. If no, the YTD key was not pressed, return is made to the call display instruction 440; if yes, the YTD key was pressed, an instruction 450 is issued to print YTD text until date is reached.

Next, a decision 452 is made as to whether the current year is being printed; if no, an instruction 454 is issued to print 12-31- and the last year in memory and proceed to instruction 458; if yes, instructions 456 and 458 are issued, respectively, to print the current year and to print the text, the starting odometer, ending odometer, total mileage, total business mileage and percent business mileage and return on return terminal 459 to call clock routine step 114 (FIG. 4).

START TRIP ROUTINE

Figure 8:
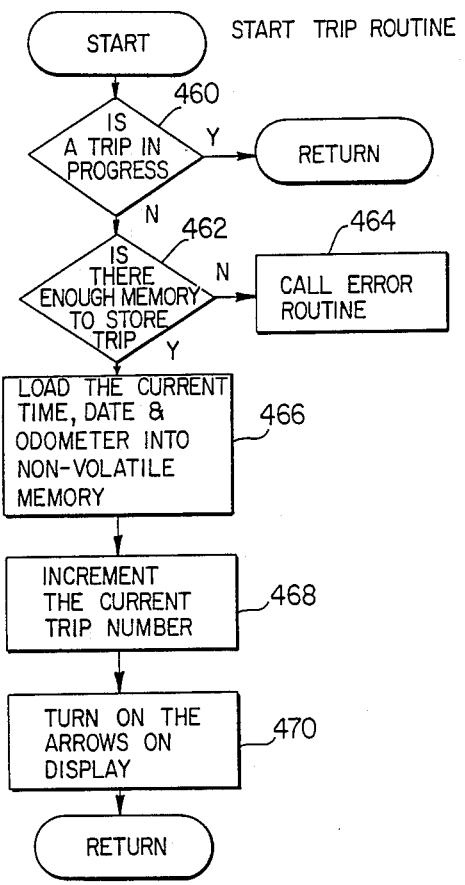
FIG. 8 is a flowchart of the calibrate routines.

Referring to FIG. 8, the start trip routine starts with a decision 460 whether there is a trip in progress; if yes, blink E's on display; if no, a decision 462 is made whether there is enough memory left to start another trip. If no, there is not enough memory room, an instruction 464 is issued to call in the error blinking E's and a 3 on the display; if yes, there is enough memory, instructions 466, 468, and 470, respectively, are issued to load the current time, date, and odometer reading into memory, increment the current trip number, and turn on arrows on display and return on terminal 471 to clock or odometer routine whichever was last executing.

CALIBRATE ROUTINE

Referring now to FIG. 9, the calibrate subroutine starts with instructions 472, 474, and 476, respectively, to set the interrupt counters to 0, convert the interrupt counters to BCD and load them into display memory, and call in the display routine 476 (FIG. 5b).

After return is made from display routine, a decision 478 is made whether a key was pressed; if yes, a decision 480 is made whether it was the EOT key. If either decision 478 or 480 is no, return is made to the convert interrupt counters instruction 474. However, if the EOT key was pressed, instruction 482 is issued to set the interrupts per mile count equal to the interrupt counter.

Then return is made on return terminal 491 to either the clock or odometer routine whichever was last executing.

INTERRUPT

When a magnet is detected to have moved past the pickup, an interrupt is generated. The interrupt (FIG. 10) starts with an instruction 490 to increment the interrupt counter. Then a decision 492 is made whether the interrupt counter is equal to the interrupt per mile count; if no, return is made to the odometer routine; if yes, a decision 494 is made whether the current trip number is equal to 0. If the decision 494 is no, an instruction 496 is issued to increment the odometer and return on return terminal 499 is made to the odometer routine; if yes, the current trip number is equal to 0, an instruction 498 is issued to increment the odometer offset and return.

TRIP REPORT ROUTINE

Referring now to FIG. 11, the trip report routine begins with a decision 500 as to whether the current trip number is equal to 0; if no, return is made to the odometer routine or the clock routine whichever was last executing; if yes, instructions 502 and 504, respectively, are issued to set the trip being printed counter to 1, to print the trip information pointed to by the trip being printed counter, and to calculate and print total mileage. Then, a decision 506 is made whether the current trip number is equal to the "trip being printed" counter; if no, an instruction 508 is issued to increment the trip being printed counter and return to step 504; if yes, an instruction 510 is issued to flashing light. Next, a decision 512 is made whether the clear key was pressed; if yes, an instruction 514 is issued to set the current trip number to 0 and return. If the decision 512 is no, a decision 516 is made whether the trip report key was pressed. If decision 516 is no, then return to the flashing display instruction 510 is made; if yes, the return is made to instruction 502 to set the trip being printed counter to 1.

ALL CLEAR ROUTINE

Referring now to FIG. 12, the all clear routine is started with instructions 518 and 520, respectively, to clear the YTD memory and set clock for the new year, for example, to 1:00/1-1-86 and to set current trip number to 0 and return is made.

END-OF-TRIP ROUTINE

Referring now to FIG. 13, the end-of-trip routine starts with a decision 522 as to whether there is a trip in progress; if no, return is made to the odometer routine; if yes, instructions 524 and 526 are issued to load current time, date and odometer reading into memory, to turn off the arrows on the display, and to return by return terminal 528 to odometer or clock routines whichever was last executing.

YEAR CHANGED ROUTINE

Figure 14:
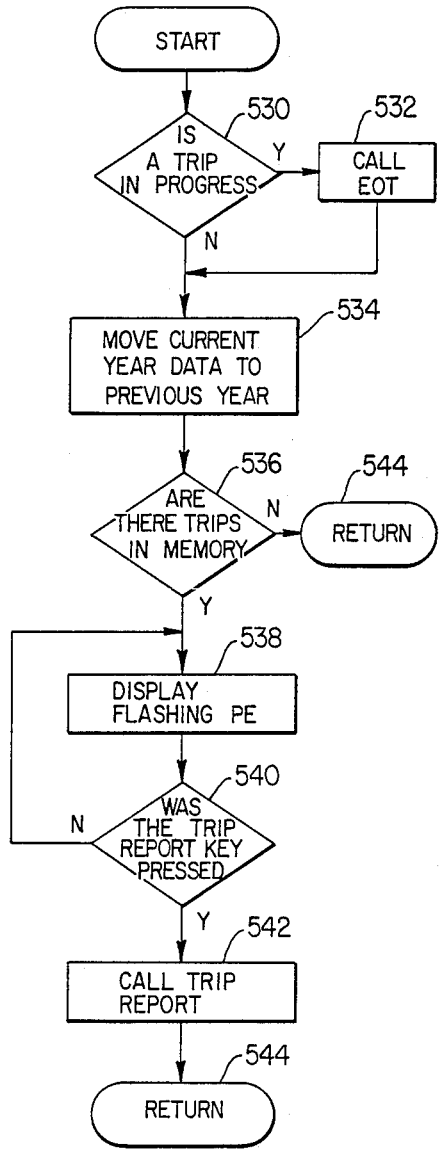
FIG. 14 is a flowchart of the year changed routine.

Referring now to FIG. 14, the year changed routine starts with a decision 530 as to whether a trip is in progress. If yes, a decision is in progress, an instruction 532 is issued for the end-of-trip routine (FIG. 13); if no, or at the end-of-trip routine an instruction 534 is issued to move the current year data to the previous year data storage area. Next, a decision 536 is made whether there are any trips in memory; if no, a return is made; if yes, an instruction 538 is issued to display flashing signal (PE). Then a decision 540 is made whether the trip report key was pressed; if no, return is made to instruction 538; if yes, an instruction 542 is issued for the call trip report routine and then return on terminal 544.

OPERATION

After the magnetic sensor has been installed or when it is desired to initialize all memory to 0, a master clear is performed. With the calibration switch 50 (FIG. 1) in the ON position, the "1" and then the "CLR" keys are pressed, and then the calibration switch is turned off. The display shows "100P".

Then the clock 14 is set by pressing the "time/date" and arrow down (hereinafter called "enter") keys. The minute display will flash for minute entry. The minutes are entered by pressing first the number keys and then the "enter" key. When the "enter" key is pressed the hour display will flash for hour entry. The hours are entered by pressing the number key and then the "enter" key. The clock operates on a 12 hour basis; thus, it is necessary to indicate whether it is AM or PM; enter AM or PM by pressing the "." key. AM is displayed by a dash; PM by a "P". Next, the year, day and month are similarly entered. With the pressing of the "enter" key, the display will flash for year entry and the year is entered, press "enter" again to enter the day, and again to enter the month. Press "enter" again and the time will be displayed. Either the time or date is displayed by pressing the "time/date" key to toggle between the time and date.

The computer mileage calculator is calibrated by placing the calibration switch 50 in the ON position. Then driving the car, noting the car's odometer tenths mile digit reading exactly at the time the "start" key is pressed. Next, after driving exactly one mile as indicated by the car's odometer tenths mile digit, the "EOT" key is pressed and then the calibration key is turned off The odometer computer is then calibrated, though the computer's odometer still needs to be set.

To set the odometer, with the car stopped, the "ODOM" key followed by the "enter" key are pressed and the car's odometer mileage entered. Tenths of a mile are not entered. Next, press the "enter" key and the computer is set. If this is the first time the odometer was set since a master clear was performed, this mileage becomes the YTD start mileage. Thereafter, each time the ignition key is turned on the time, date, odometer reading and distance traveled is automatically recorded. Thus, unless a trip is entered as a business trip all mileage is recorded as personal use mileage. However, when a business trip is entered an interrupt signal diverts the computer to a business trip event.

A business trip is entered by pressing the "start" key. The display shows a "<<<" in the upper left corner to indicate a trip in progress, and the unit is tallying the trip mileage. The display can show the time, date, or odometer reading by pressing the "time/date" or "ODOM" keys. Nonessential keys when pressed have no effect on the computer's operation. For example, while a trip is in progress the pressing of the "TRIP REP" or "YTD REP" will result in no operation being performed.

To end the business trip, press the "EOT" key this logs the complete data for the trip in memory.

During a business trip, the car may be used for a personal excursion trip, to temporarily stop the business trip the "PAUSE/REP" key is pressed. The display shows a "+" on the far left to indicate that the trip in progress is in a "pause" mode and that the current mileage is not being tallied as business mileage, but as personal mileage. To resume the original trip mileage, the "PAUSE/REP" key is pressed and the "+" display is removed.

To print a trip report, the "TRIP REP" key is pressed to cause the printer to print out a record of all business trips in memory. Flashing E's and a Z in the display reminds one that the printer is either not "ON" or is disconnected. After correction, the "CLR" key is pressed and the "TRIP REP" key is pressed to print out the record.

After printing the record, the display shows a flashing "LP". The "TRIP REP" key can be pressed again for as many copies as are desired. By pressing "CLR", the memory is cleared of prior trips and ready for new trips.

For a year-to-date report, the "YTD REP" key is pressed. The display will show a number indicating the current year. If a current year-to-date report is desired, the "YTD REP" key is pressed again; if a last year's report is desired, the "." key is pressed and then the "YTD" key is pressed. When the "." key was pressed the display will show the last year's number. Year-to-date reports can be printed out as desired; because, only a master clear will clear the year mileage memory.

On the change of the year, any trips in progress are automatically ended and tallied in the yearly business mileage and are stored as previous year mileage. The memory is cleared automatically for the new year. Thus, any previous trips in memory must be printed out before any further trips can be entered. The display shows a flashing "PE" indicating a need to press "TRIP REP" to print out the trip information in memory.

It is not necessary to immediately print out the yearly trip mileage; because, on the change of the year, the computer stores in memory the total mileage for that year as previous year mileage and sets your new year's mileage to 0.

Although only a single embodiment of the invention has been described, it will be apparent to a person skilled in the art that various modifications to the details of construction shown and described may be made without departing from the scope of the invention.

What is claimed is:

1. An odometer monitoring system for a vehicle comprising:
    (a) a power supply means for producing a stable voltage from a vehicle power supply responsive to ignition switch turn on of the vehicle;
    (b) a sensor means including a sensor for sensing the rotations of a drive shaft and a means for generating signals representative of the drive shaft rotations;
    (c) a clock means for generating clock pulses and time and data information;
    (d) input means including digit keys, odometer key, time/data key, start key, pause key, end of trip key, trip report key, and year to data key;
    a calibration switch means for selecting either a distance calibration operation mode or a distance measurement mode of operation;
    (f) a display means for displaying operation information; and
    (g) an odometer computer means connected to the power supply means for receiving electrical operating power, said odometer computing means including counting means and first and second storage means, the counting means being connected to the sensor means for counting the number of signals output by the sensor means, means connected to the calibration switch means for activating the counting means for selectively determining the number of drive shaft rotations per measurement unit for calibration or for accumulating the number of drive shaft revolutions during a trip, means connected to the counting means for determining the distance being traveled using the number of drive shaft revolutions per measurement unit and the number of rotations counted during a trip for storage in the first storage means; means connected to the odometer key and digit keys for entering an odometer reading into the first storage means; means connected to the clock means and display means and responsive to the time and date key and digit keys for setting the clock, means connected to the start key for loading into the first storage means trip information for the beginning of a business trip including the current time and date and odometer reading and incrementing a trip number, means connected to the end of trip key for loading trip ending trip report information including time and date, trip distance, and odometer reading into the first storage means, means connected to the pause key for interrupting a business trip in progress for storing trip report information for a nonbusiness use and at the end thereof responsive to the pause key for resuming tallying the distance of the business trip for a business trip report, means connected to the clock and date means for determining whether the year has ended, means connected to the start key and clock means for determining whether a trip is in progress at the end of the year, means connected to the end of trip key for ending any trip in progress, means connected to the first storage means for accumulating total distance and business trip distance for a year and a year to date report, means interconnecting the first and second storage means for transferring the year or year to date report date to the second storage means and clearing the first storage means for receiving the next year to date information; and means connected to the year to date key and a period key for outputting year to date report information selectively from either the first storage means or from the second storage means to an output port, and a trip report means connected to the trip report key for outputting the trip report information to the output port.

2. An odometer monitoring system for a vehicle comprising:
- (a) a sensor means including a sensor for sensing the rotations of a drive shaft and a means for generating signals representative of the drive shaft revolutions;
- (b) a clock means for generating clock pulses and time and date information;
- (c) input means including digit keys, odometer key, time/date key, start key, end of trip key, year to date key, and trip report key;
- (d) a display means for displaying operational information; and
- (e) an odometer computer means connected to the power supply means for receiving electrical operating power, said odometer computer means including:

counting means connected to the sensor means and responsive to the start key being pressed for counting the number of drive shaft revolutions occurring during a business trip;

a first storage means connected to the counting means for storing the counted number of revolutions;

a first means connected to the first storage means for fetching the drive shaft revolution count periodically for determining the distance being traveled during said business trip and updating the distance traveled in the first storage means;

a second means connected to the odometer key and digit keys for entering an odometer reading into the first storage means at the beginning of said business trip;

a third means connected to the clock means for loading into the first storage means the time and date responsive to the pressing of the start key;

a fourth means connected to the first storage means for fetching the time and date and odometer reading at the beginning of each business trip and the miles traveled for the trip responsively to the pressing of the trip report key for preparation of a trip report for a preselected time period;

a fifth means connected to the clock means for determining whether the year has ended;

a sixth means connected to the start key and clock means for determining whether a trip is in progress at the end of the year;

a seventh means connected to the end of trip means for ending any trip in progress;

an eighth means connected to the first storage means for accumulating total distance for a year and a year to date report;

a nineth means interconnecting the first storage and a second storage means for transferring the year or year to date report data to the second storage means and clearing the first storage means for receiving the next year to date information; and a tenth means connected to the year to date key and a period key for outputting year to date report information selectively from either the first storage means or from the second storage means to an output port, and a trip report means connected to the trip report key for outputting the trip report information to the output port.

* * * * *